(12) United States Patent
Sato

(10) Patent No.: US 8,228,050 B2
(45) Date of Patent: Jul. 24, 2012

(54) SWITCHING POWER SUPPLY

(75) Inventor: Tadahiko Sato, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 358 days.

(21) Appl. No.: 12/700,173

(22) Filed: Feb. 4, 2010

(65) Prior Publication Data

US 2010/0201333 A1  Aug. 12, 2010

(30) Foreign Application Priority Data

Feb. 4, 2009  (JP) .................... 2009-023834

(51) Int. Cl.
*G05F 1/00* (2006.01)
(52) U.S. Cl. ............... 323/272; 323/284; 323/271
(58) Field of Classification Search .......... 323/282, 323/283, 284, 224, 271, 272
See application file for complete search history.

(56) References Cited

U.S. PATENT DOCUMENTS 7,900,361 B2 *   3/2011  Adest et al. ............. 30/80
2011/0285375 A1 * 11/2011  Deboy ................. 323/299

FOREIGN PATENT DOCUMENTS

JP       04-096649 A    3/1992

\* cited by examiner

*Primary Examiner* — Shawn Riley
(74) *Attorney, Agent, or Firm* — Rossi, Kimms & McDowell LLP

(57) ABSTRACT

A switching power supply is a buck DC-DC converter that includes a plurality of inductors and switching devices that control the connection relations of the inductors, the ON and OFF of the switching devices are controlled such that the inductors are connected in series to each other while the switching devices are ON and such that the inductors are connected in parallel to each other while the switching devices are OFF for obtaining a low output voltage easily. The ON and OFF of the switching devices are controlled such that some of the inductors are disconnected for realizing a DC-DC converter that exhibits different performance. The switching power supply according to the invention facilitates preventing the circuit scale from being enlarged, preventing especially the number of large-capacity capacitors from increasing and obtaining a low output voltage.

10 Claims, 15 Drawing Sheets

SWITCHING POWER SUPPLY

BACKGROUND

The present invention relates to a switching power supply that includes a plurality of inductors and changes the connecting relation of the inductors during the operations thereof.

A configuration example of a conventional switching power supply will be described below with reference to FIG. 13. FIG. 13 is a block circuit diagram of a buck DC-DC converter that conducts a pulse width modulation (hereinafter referred to as a "PWM") to generate output voltage Eo from input voltage Ei and feeds output voltage Eo to load RL. The buck DC-DC converter includes error amplifier 1 formed of an operational amplifier, oscillator 2, PWM comparator 3, P-channel metal-oxide-semiconductor field-effect transistor (hereinafter referred to as "MOSFET") Q1 working for a switching device (hereinafter the switching device will be designated by Q1), commutation diode D1, diver circuit 4 that drives switching device Q1 based on the output from PWM comparator 3, inductor L1, output capacitor Co, resistors R1 and R2 working for a feedback means for voltage setting, reference voltage supply 5 that generates reference voltage Vref, and DC input power supply 6 that feeds input voltage Ei.

Reference voltage Vref is fed to the non-inverting input terminal of error amplifier 1. Feedback signal $V_{FB}$ obtained by dividing output voltage Eo with resistors R1 and R2 is fed to the inverting input terminal of error amplifier 1. Resistor R3 and capacitor C1 are connected between the output terminal and the inverting input terminal of error amplifier 1 for phase compensation. Output signal Verr from error amplifier 1 is fed to the non-inverting input terminal of PWM comparator 3. Output signal Vosc from oscillator 2 is fed to the inverting input terminal of PWM comparator 3.

Output signal Vosc from oscillator 2 is a triangular wave, a sawtooth wave or a sinusoidal wave. In FIG. 13, output signal Vosc is illustrated by a triangular wave exemplary. PWM comparator 3 compares output signal Verr from error amplifier 1 with triangular wave Vosc. When the signal level of triangular wave Vosc is lower than the signal level of output signal Verr, PWM comparator 3 sets the PWM signal thereof at a high level (hereinafter referred to as an "H-level") and feeds the H-level PWM signal to driver circuit 4. When the signal level of triangular wave Vosc is equal to or higher than the signal level of output signal Verr, PWM comparator 3 sets the PWM signal thereof at a low level (hereinafter referred to as an "L-level") and feeds the L-level PWM signal to driver circuit 4.

The drain of switching device Q1 and the cathode of diode D1 are connected to each other. The drain of switching device Q1 and the cathode of diode D1 are connected also to the first end of inductor L1. The source of switching device Q1 is connected to the high-potential-side terminal of DC input power supply 6. The anode of diode D1 is connected to the low-potential-side terminal of DC input power supply 6. The second end of inductor L1 is connected to load RL. Output capacitor Co and a series circuit consisting of resistors R1 and R2 are connected in parallel to each other between the second end of inductor L1 and the low-potential-side terminal of DC input power supply 6. The potential at the connection point of resistors R1 and R2 is fed to the inverting input terminal of error amplifier 1 as feedback signal $V_{FB}$.

Now the operations of the DC-DC converter will be briefly described below. Error amplifier 1 feeds error signal Verr obtained by amplifying the difference between reference voltage Vref and feedback signal $V_{FB}$ to PWM comparator 3. PWM comparator 3 compares error signal Verr and triangular wave Vosc to each other and feeds a switching signal (PWM signal) to switching device Q1 via driver circuit 4. The PWM signal is a rectangular wave signal having a certain period but the H/L ratio in one period changes based on the output from error amplifier 1. As (Vref–$V_{FB}$) is larger, PWM comparator 3 generates a rectangular wave that makes the ON-period (conduction-period) of switching device Q1 in one switching period longer to accumulate more energy in inductor L1 and further to keep output voltage Eo at a certain value. As (Vref–$V_{FB}$) is smaller, PWM comparator 3 generates a rectangular wave that makes the ON-period (conduction-period) of switching device Q1 in one switching period shorter to accumulate less energy in inductor L1 and further to keep output voltage Eo at a certain value. Resistors R1 and R2 constitute a feedback signal generator circuit. Resistor R3, capacitor C1, error amplifier 1, and reference voltage supply 5 constitute an error amplifier circuit.

If the ON-period and OFF-period of switching device Q1 are represented by Ton and Toff, respectively, and the switching period by Ts (=Ton+Toff), the input voltage value Ei and the output voltage value Eo of the conventional buck DC-DC converter will be related with each other by the following formula (1).

$$Eo=(Ton/Ts)Ei=D \cdot Ei \qquad (1)$$

Here, D=Ton/Ts is an ON-time ratio, that is the ratio of the ON-period Ton to the switching period Ts. Although the ON-time ratio D may be any value between 0 and 1 according to the formula (1), an ON-time ratio D close to the upper limit 1 and an ON-time ratio D close to the lower limit 0 are restricted in the practical circuits.

In other words, PWM comparator 3 compares error signal Verr with triangular wave Vosc and generates the switching signal (PWM signal). Since the upper and lower limits of the ON-time ratio D are determined by the upper and lower limits of triangular wave Vosc, it is difficult to precisely control the minute time widths of the ON-period Ton and the OFF-period Toff due to the adverse effects of the noises contained in triangular wave Vosc and error signal Verr. Therefore, there remains no choice but to limit the value of the ON-time ratio D.

Recently, the switching frequency has been becoming higher and higher. When the switching frequency is 1 MHz or higher, it is necessary to control the time width of several tens ns or shorter as the minute time widths described above. The adverse effects of the delay times caused by various circuit elements on the time width described above are not ignorable. Sometimes, the pulse itself vanishes. Therefore, it is very much necessary to set upper and lower limits for the ON-time ratio D. When the ON-time ratio D is close to 1 for a long time, the current flowing through inductor L1 keeps increasing, resulting in an overcurrent. To prevent the overcurrent from causing, an upper limit is set for the ON-time ratio D usually. Usually, the ON-time ratio D is limited to be from 0.1 to 0.9.

The upper and lower limits of the ON-time ratio D are limited also in the other types of DC-DC converters other than the buck DC-DC converter. A DC-DC converter of an inversion type and a DC-DC converter of a boost type are disclosed in the following Patent Document 1 for obtaining the upper limit of the ON-time ratio D, that is for obtaining a high output voltage. The DC-DC converters disclosed in Japanese Unexamined Patent Application Publication No. Hei. 4 (1992)-96649 employ two inductors (reactors) and connect the inductors in parallel while the switching device is ON and in series while the switching device is OFF so that a high output voltage may be obtained without setting the ON-time ratio D in the vicinity of the upper limit thereof.

However, it is difficult for the conventional technique to obtain a low output voltage corresponding to an ON-time ratio D close to the lower limit value. The above-identified reference discloses how to obtain a high output voltage but nothing on obtaining a low output voltage. Recently, the power supply voltage for microprocessors and such large scale LSIs has been lowered. For meeting the recent demands, it is necessary for the ON-time ratio D of the DC-DC converter to close to the lower limit thereof. However, it is difficult for the conventional DC-DC converter to make the ON-time ratio D thereof close to the lower limit thereof.

For obtaining a low output voltage, it may be effective to connect a plurality of conventional DC-DC converters in series as shown in FIG. 15 so that the total step down ratio (Eo/Ei) may be lowered. However, this technique causes the problems described below. The fundamental structure of a single-stage DC-DC converter obtained by removing the control circuit including the feedback system from the circuit shown in FIG. 13 is shown in FIG. 14. The DC-DC converter shown in FIG. 15 connects two single-stage DC-DC converters shown in FIG. 14 in series.

In detail, the DC-DC converter shown in FIG. 15 connects, in the subsequent stage of the DC-DC converter shown in FIG. 14, a DC-DC converter including switching device Q2, inductor L2, commutation diode D2, and output capacitor Co2. The DC-DC converter shown in FIG. 15 steps down output voltage Eo1 fed across capacitor Co1 of the DC-DC converter in the first stage with the DC-DC converter in the subsequent stage to obtain low output voltage Eo and to feed low output voltage Eo to load RL. The control circuit is not shown in FIG. 15. It is necessary for the technique that connects a plurality of DC-DC converters in series as shown in FIG. 15 to employ full sets of converter circuits. Therefore, the technique that connects a plurality of DC-DC converters in series as shown in FIG. 15 is not advantageous for reducing the manufacturing costs and the size of the resulting DC-DC converter. Especially, since it is necessary to dispose an output capacitor for each of the DC-DC converters and since it is necessary for the capacitance of the output capacitor to be large to some extents, the disposition of a plurality of output capacitors greatly affects adversely.

In view of the foregoing, it would be desirable to obviate the problems described above. It would be also desirable to provide a switching power supply that facilitates preventing the circuit scale thereof from being enlarged, preventing the number of the large-capacity capacitors from increasing, and obtaining a low output voltage.

SUMMARY OF THE INVENTION

The present invention provides a switching power supply that facilitates preventing the circuit scale thereof from being enlarged, preventing the number of the large-capacity capacitors from increasing, and obtaining a low output voltage.

In accordance with the invention, the switching power supply includes a DC power supply having a low-potential-side terminal and a high-potential-side terminal, an output capacitor having a first end and a second end, the first end of the output capacitor being connected to the low-potential-side terminal of the DC power supply, a first switching device through an n-th. switching device, the n being a positive integer equal to two or larger, a first inductor through an n-th. inductor, the first switching device through the n-th. switching device and the first inductor through the n-th. inductor being connected alternately between the high-potential-side terminal of the DC power supply and the second end of the output capacitor, the first switching device being connected to the high-potential-side terminal of the DC power supply, the n-th. inductor being connected to the second end of the output capacitor, a commutation element, n-pieces of the commutation elements being connected between the connection point of an i-th. switching device and an i-th. inductor and the low-potential-side terminal of the DC power supply, said i being positive integers one through n, and a changeover switch, (n−1)-pieces of the changeover switches being connected between the connection point of a (j−1)-th. inductor and a j-th. switching device and the second end of the output capacitor, said j being positive integers two through n.

According to a further aspect of the invention, the first through n-th. switching devices are turned ON and OFF synchronously, and the (n−1)-pieces of the changeover switches are turned ON and OFF in compensation for the ON and OFF of the first through n-th. switching devices for controlling the ON-OFF timing of the first through n-th. switching devices and for obtaining the predetermined output voltage.

According to further aspect of the invention, the switching power supply includes a first mode of operation, the first mode of operation including the synchronous turning ON and OFF of the first through n-th. switching devices and the turning ON and OFF of the (n−1)-pieces of the changeover switches in compensation for the ON and OFF of the first through n-th. switching devices for controlling the ON-OFF timing of the first through n-th. switching devices and for obtaining the predetermined output voltage, and a second mode of operation, the second mode of operation including: the turning OFF of the m-th. switching device of the first through n-th, switching devices, said m being any of positive integers two through n, the synchronous turning ON and OFF of the first through (m−1)-th. switching devices, the turning ON of the m-th. changeover switch of the (n−1)-pieces of the changeover switches, the turning OFF of the (m+1)-th. through n-th. changeover switches, if m<n, and the turning ON and OFF of the second through (m−1)-th. changeover switches in compensation for the turning ON and OFF of the first through (m−1)-th. switching devices, if m>2, for controlling the ON-OFF timing of the first through (m−1)-th. switching devices and for obtaining a predetermined output voltage.

According to a further aspect of the invention, the switching power supply further includes an (n+1)-th. switching device connected between the n-th inductor and the second end of the output capacitor, the (n+1)-th. switching device being ON in the first mode of operation, and the (n+1)-th. switching device being OFF in the second mode of operation.

According to a further aspect of the invention, the commutation element is a diode.

According to a further aspect of the invention, the commutation element is a synchronous rectifier transistor.

According to a further aspect of the invention, the switching power supply further includes a buffer capacitor connected between at least one of the connection points of the (j−1)-th. inductor and the j-th. switching device and the low-potential-side terminal of the DC power supply or the second end of the output capacitor.

According to a further aspect of the invention, the inductance values L1 through Ln of the first through n-th. inductors are related with each other by a following relational expression, $$Lk \leq L(k+1).$$

Here, k is positive integers 1 through (n−1).

According to a further aspect of the invention, the switching power supply further includes a clamping element connected in parallel to at least one of n-pieces of series circuits including the i-th. switching device and the i-th. inductor.

According to a further aspect of the invention, the clamping element is a diode having a cathode connected to the terminal of the series circuit on the side of the switching device and an anode connected to the terminal of the series circuit on the side of the inductor.

The switching power supply according to the invention is a buck DC-DC converter that includes a plurality of inductors and switching devices that control the connection relations of the inductors, the ON and OFF of the switching devices are controlled such that the inductors are connected in series to each other while the switching devices are ON and such that the inductors are connected in parallel to each other while the switching devices are OFF for obtaining a low output voltage.

The ON and OFF of the switching devices are controlled such that some of the inductors are disconnected from the converter circuit for realizing a DC-DC converter that exhibits different performance.

BRIEF DESCRIPTIONS OF THE DRAWINGS

The invention will be described with reference to certain preferred embodiments thereof and the accompanying drawings, wherein:

FIG. 5($b$) is a circuit diagram describing the operation state of the DC-DC converter circuit shown in FIG. 3 in a second phase of operation thereof;

FIG. 5($c$) is a circuit diagram describing the operation state of the DC-DC converter circuit shown in FIG. 3 in a third phase of operation thereof;

FIG. 5($d$) is a circuit diagram describing the operation state of the DC-DC converter circuit shown in FIG. 3 in a fourth phase of operation thereof;

FIG. 6($b$) is a circuit diagram describing the operation state of the DC-DC converter circuit shown in FIG. 3 in a sixth phase of operation thereof;

FIG. 6($c$) is a circuit diagram describing the operation state of the DC-DC converter circuit shown in FIG. 3 in a seventh phase of operation thereof;

FIG. 7($b$) is a circuit diagram describing the operation state of the DC-DC converter circuit shown in FIG. 3 in a ninth phase of operation thereof;

DETAILED DESCRIPTION OF THE PREFERRED EMBODIMENTS OF THE INVENTION

Figure 1:
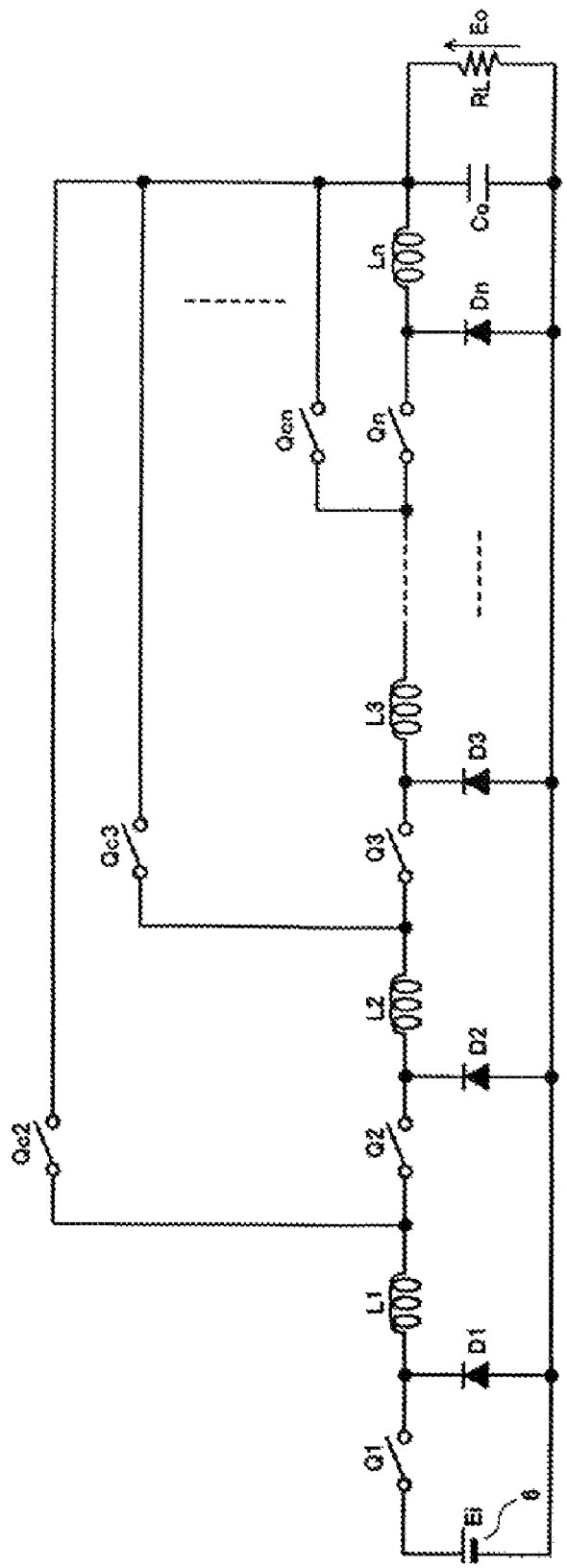
FIG. 1 is a circuit diagram describing the fundamental configuration of a switching power supply according to the invention.

FIG. 1 is a circuit diagram describing the fundamental configuration of a switching power supply according to the invention. The switching power supply shown in FIG. 1 is a buck DC-DC converter that steps down input voltage Ei to obtain output voltage Eo. The DC-DC converter shown in FIG. 1 includes n-pieces of inductors L1 through Ln, n-pieces of switching devices Q1 through Qn, n-pieces of diodes D1 through Dn, (n−1)-pieces of changeover switches Qc2 through Qcn, and output capacitor Co. Here, n is a positive integer equal to 2 or larger. Switching device Q1 in FIG. 1 corresponds to switching device Q1 in FIGS. 13 and 14.

The low-potential-side terminal of DC input power supply 6 that feeds input voltage Ei, the first end of output capacitor Co and the anodes of diodes D1 through Dn are connected in common. From the high-potential-side terminal of DC input power supply 6 toward the second end of output capacitor Co, n-pieces of switching devices and n-pieces of inductors are connected alternately in series in the order of switching device Q1, inductor L1, switching device Q2, inductor L2, . . . , switching device Qn, and inductor Ln.

The cathodes of diodes D1 through Dn are connected to the connection point of switching device Q1 and inductor L1, the connection point of switching device Q2 and inductor L2, . . . , and the connection point of switching device Qn and inductor Ln, respectively. The first ends of (n−1)-pieces of changeover switches Qc2 through Qcn are connected to the second end of output capacitor Co. The second ends of (n−1)-pieces of changeover switches Qc2 through Qcn are connected to the connection point of inductor L1 and switching device Q2, the connection point of inductor L2 and switching device Q3, . . . , and the connection point of inductor L(n−1) and switching device Qn, respectively.

Voltage Eo across output capacitor Co is the output voltage of the DC-DC converter according to the invention and applied to load RL.

Now the operations of the DC-DC converter shown in FIG. 1 will be described below. First, the fundamental operation of the DC-DC converter shown in FIG. 1 will be described. Switching devices Q1 through Qn are turned ON and OFF simultaneously and changeover switches Qc2 through Qcn are turned ON and OFF in compensation for the ON and OFF of switching devices Q1 through Qn. In other words, when switching devices Q1 through Qn are ON simultaneously, changeover switches Qc2 through Qcn are OFF simultaneously. When switching devices Q1 through Qn are OFF simultaneously, changeover switches Qc2 through Qcn are ON simultaneously.

In practice, if switching device Qi and changeover switch Qci (i=2, 3, . . . or n) are OFF simultaneously, the current flowing through inductor L(−1) will flow into the floating capacitance, causing a high voltage applied to switching device Qi and changeover switch Qci. Therefore, if one wants to bring either switching devices Q1 through Qn or changeover switches Qc2 through Qcn from the ON-state to the OFF-state, it is preferable to bring either changeover switches Qc2 through Qcn or switching devices Q1 through Qn from the OFF-state to the ON-state first and, then, to bring either switching devices Q1 through Qn or changeover switches Qc2 through Qcn from the ON-state to the OFF-state sequentially.

The DC-DC converter shown in FIG. 1 is configured such that inductors L1 through Ln are connected in series between the high-potential-side terminal of DC input power supply 6 and the high-potential-side terminal of output capacitor Co, while switching device Q1 through Qn are ON simultaneously. While switching device Q1 through Qn are OFF simultaneously and changeover switches Qc2 through Qcn are ON simultaneously, a series circuit of diode D1 and inductor L1, a series circuit of diode D2 and inductor L2, . . . , and a series circuit of diode Dn and inductor Ln are connected in parallel to output capacitor Co.

The input voltage Ei and the output voltage Eo in the steady state are related with each other as described below using the ON-period Ton, the OFF-period Toff and the switching period Ts (=Ton+Toff) of switching devices Q1 through Qn. The inductance values of n-pieces of inductors L1 through Ln are assumed to be the same L. First, the increment ΔI1 of the inductor current that flows through the inductors in the ON-period Ton is given by the following formula (2).

$$\Delta I1 = ((Ei-Eo)/nL) \cdot Ton \quad (2)$$

The decrement ΔI2 of the inductor current that flows through the inductors in the OFF-period Toff is given by the following formula (3).

$$\Delta I2 = (Eo/L) \cdot Toff \quad (3)$$

Since the current increment ΔI1 and the current decrement ΔI2 are equal to each other in the steady state, the following formula (4) is obtained from the formulas (2) and (3).

$$((Ei-Eo)/nL) \cdot Ton = (Eo/L) \cdot Toff \quad (4)$$

By solving the formula obtained by dividing the both sides of the formula (4) by Ei and by replacing Ton/(Ton+Toff) by D, the following formula (5) is obtained.

$$(Eo/Ei) = D/(n(1-D)+D) = 1/((1-n)+D/n) \quad (5)$$

Figure 2:
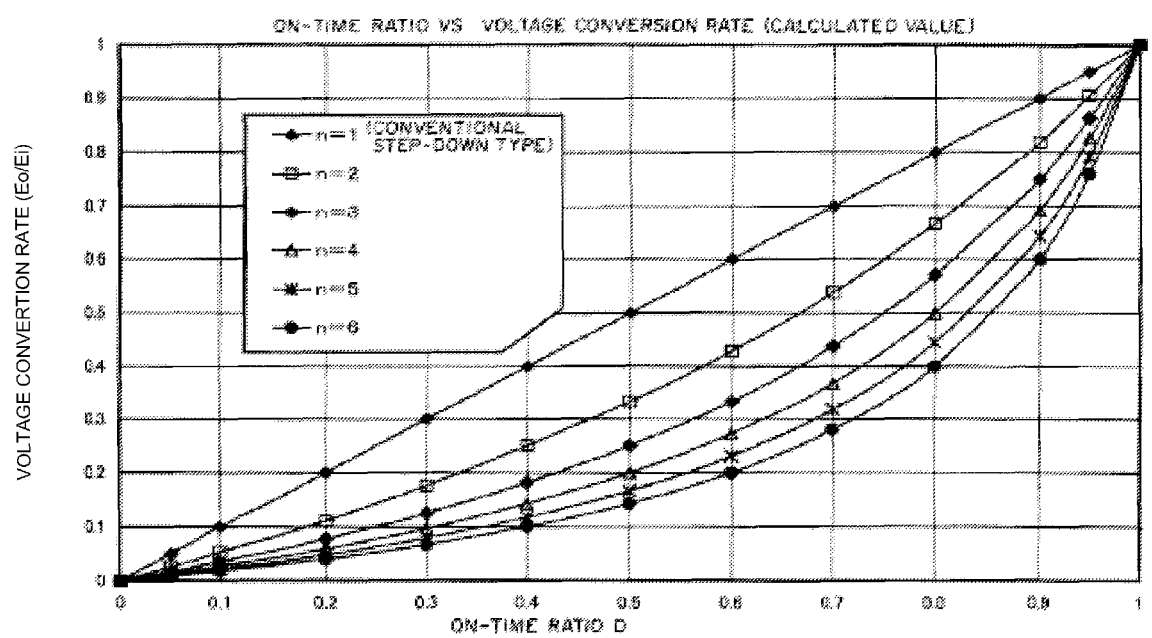
FIG. 2 is a graph relating the voltage conversion rate (Eo/Ei) obtained from the following formula (5) with the ON-time ratio D.

The voltage conversion rates (Eo/Ei) calculated from the formula (5) using n as a parameter are described in FIG. 2. As FIG. 2 indicates, the voltage conversion rate for an arbitrary ON-time ratio D is made to be lower, as n is larger, as compared with the voltage conversion rate of the conventional buck DC-DC converter, in which n=1. In other words, lower output voltage Eo can be obtained, as n is larger.

Figure 3:
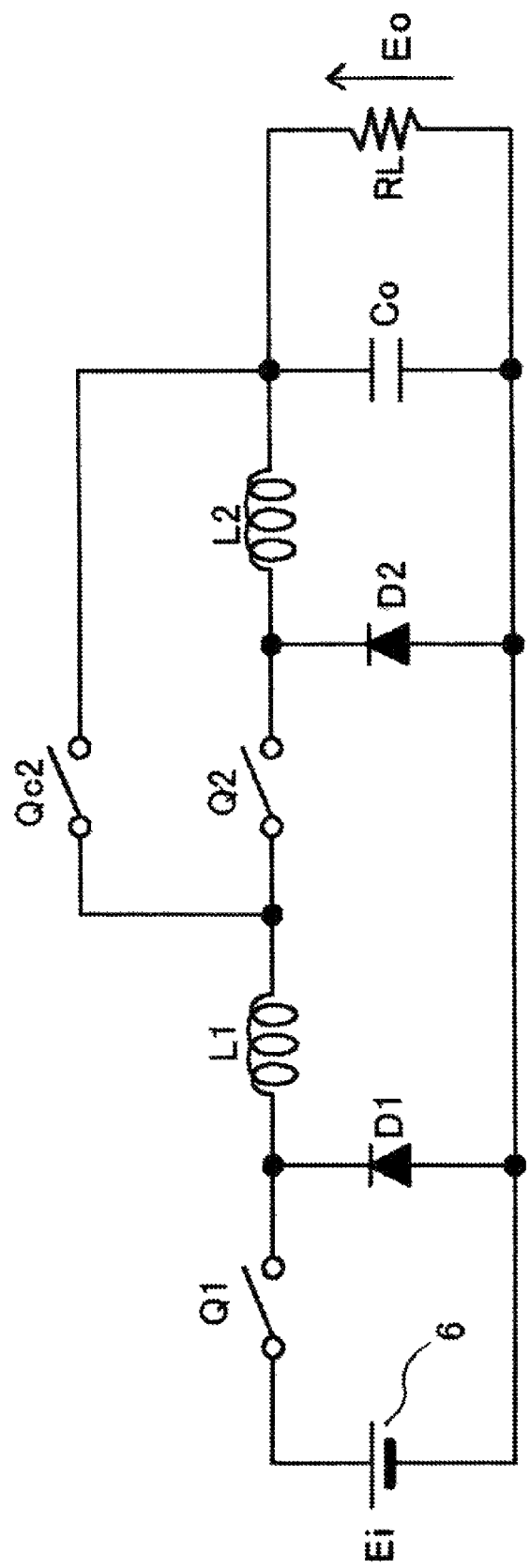
FIG. 3 is a circuit diagram showing the fundamental configuration of the DC-DC converter shown in FIG. 1, in which n=2.
Figure 4:
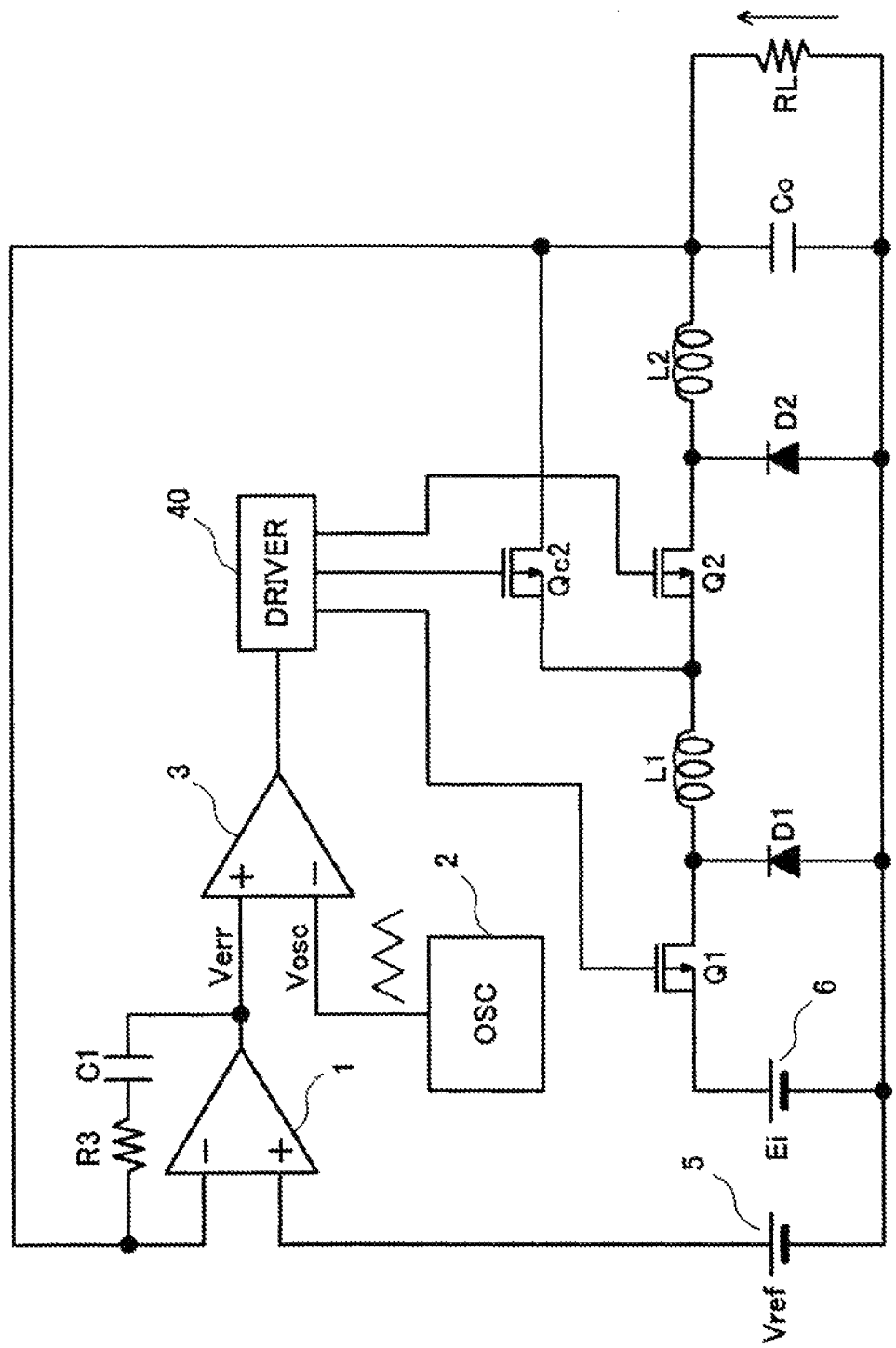
FIG. 4 is a circuit diagram showing a DC-DC converter that includes a control circuit added to the fundamental configuration shown in FIG. 3.
Figure 13:
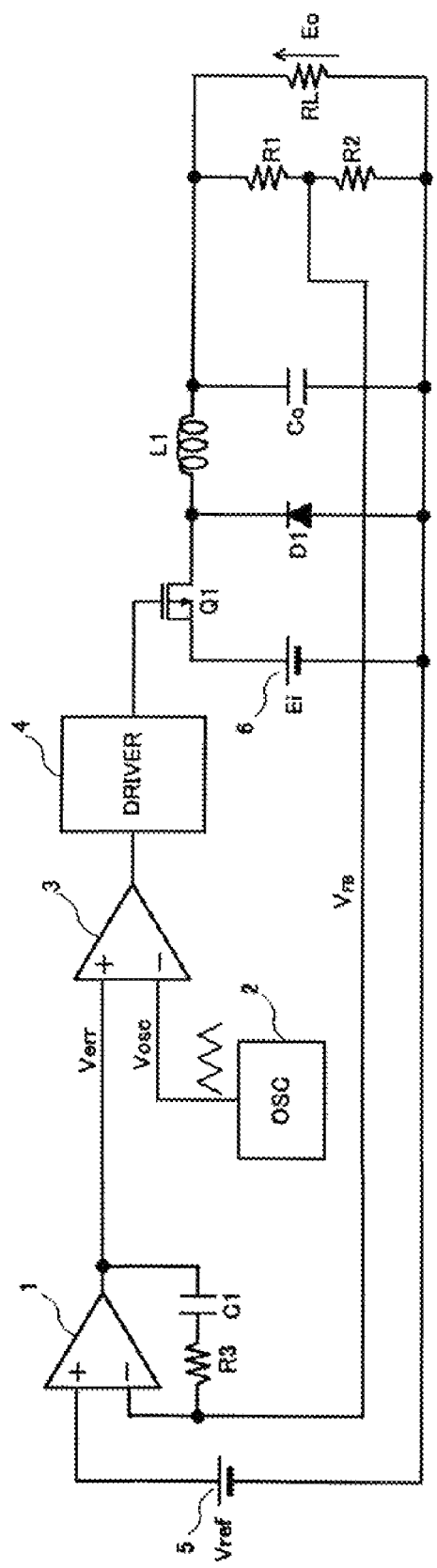
FIG. 13 is a block circuit diagram showing a configuration example of a conventional switching power supply.
Figure 14:
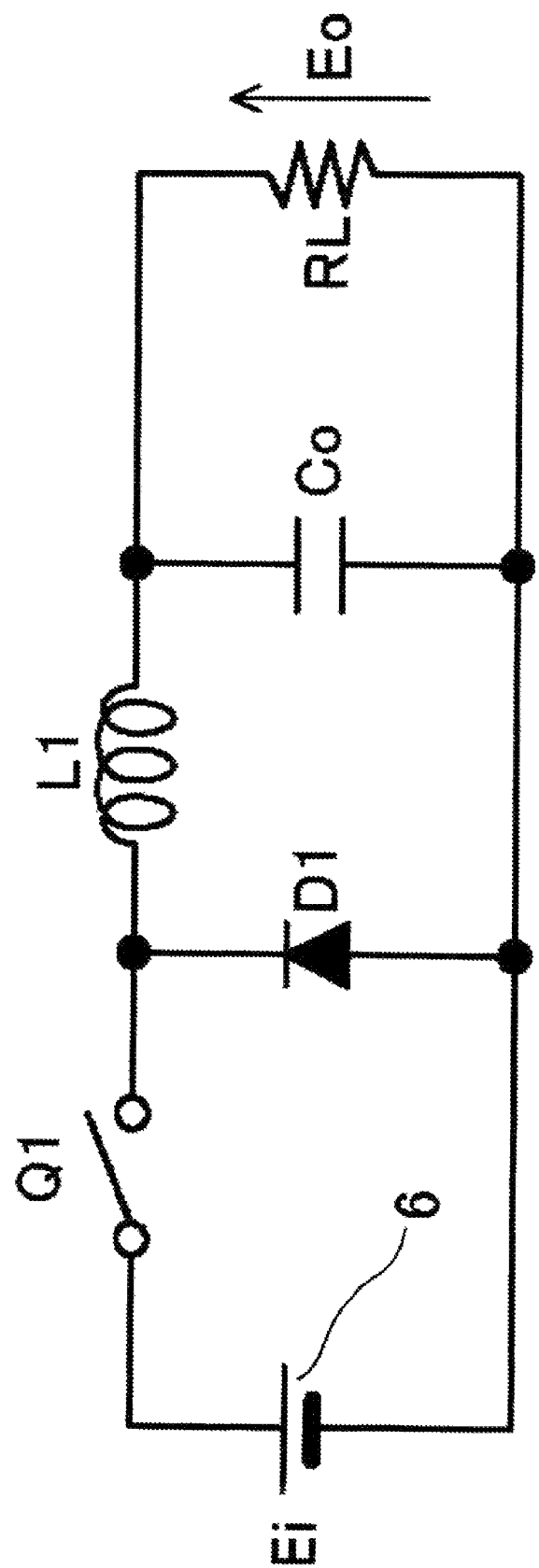
FIG. 14 is a circuit diagram showing the fundamental structure of a DC-DC converter having a single stage configuration obtained by removing the control circuit including the feedback system from the circuit shown in FIG. 13.
Figure 15:
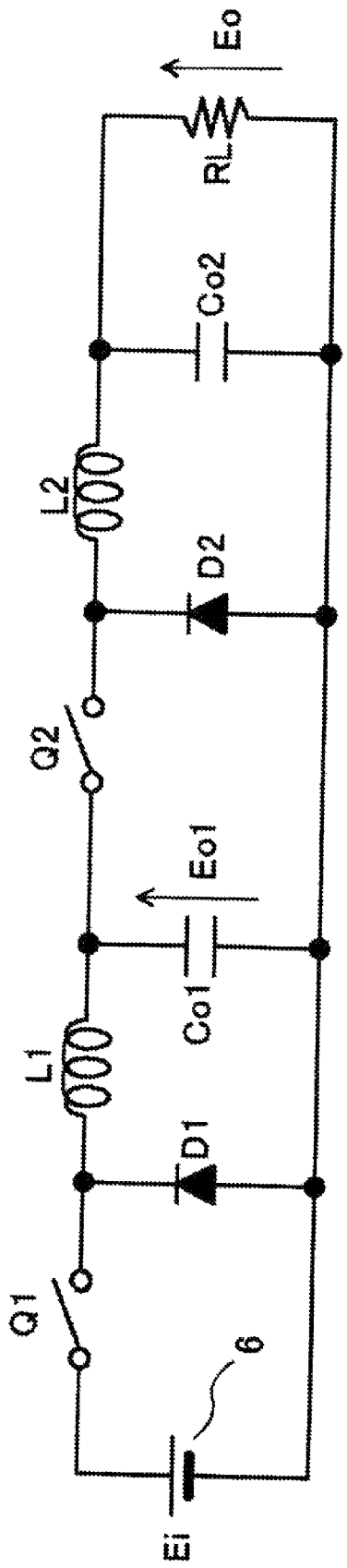
FIG. 15 is a circuit diagram showing the fundamental configuration of a DC-DC converter obtained by connecting two stages of the DC-DC converters shown in FIG. 14.

Now detailed descriptions will be made on the case, in which n=2. FIG. 3 is a circuit diagram showing the fundamental configuration of a buck DC-DC converter according to the invention, in which n=2. A DC-DC converter circuit obtained by adding a control circuit to the fundamental configuration shown in FIG. 3 is shown in FIG. 4. Although a control circuit that is fundamentally the same with the control circuit of the conventional switching power supply shown in FIG. 13 is employed in FIG. 4, the control circuit in FIG. 4 may be replaced by a control circuit that conducts digital controls. The same reference numerals and symbols used in FIG. 13 are used in FIGS. 3 and 4 to designate the same constituent elements and their duplicated descriptions are omitted for the sake of simplicity.

In the DC-DC converter circuit shown in FIG. 4, each of switching devices Q1, Q2 and changeover switch Qc2 is formed of a P-channel MOSFET. Driver circuit 4 in FIG. 13 drives P-channel MOSFET Q1. Driver circuit 40 in FIG. 4 drives three P-channel MOSFETs Q1, Q2 and Qc2. Error amplifier 1 amplifies the difference between reference voltage Vref and the feedback signal of output voltage Eo to obtain error signal Verr and feeds error signal Verr to PWM comparator 3.

PWM comparator 3 compares error signal Verr with triangular wave Vosc to obtain a switching signal (PWM signal) having a rectangular waveform and a certain period. The H/L ratio in one switching period of the rectangular switching signal (PWM signal) changes based on the output from error amplifier 1. PWM comparator 3 feeds the rectangular switching signal (PWM signal) as obtained or the rectangular switching signal (PWM signal) inverted to the gates of P-channel MOSFETs Q1, Q2 and Qc2 via driver circuit 40. When the output from PWM comparator 3 is at the H-level, driver circuit 40 drives P-channel MOSFETs Q1, Q2 and Qc2 so that P-channel MOSFETs Q1 and Q2 may be ON and P-channel MOSFET Qc2 may be OFF. When the output from PWM comparator 3 is at the L-level, driver circuit 40 drives P-channel MOSFETs Q1, Q2 and Qc2 so that P-channel MOSFETs Q1 and Q2 may be OFF and P-channel MOSFET Qc2 may be ON.

In other words, as $(Vref-V_{FB})$ is larger, a rectangular pulse that elongates the ON-period Ton, for which switching devices Q1 and Q2 are ON (conductive), is generated to increase the energy stored in inductors L1 and L2 and further to keep output voltage Eo at a certain value. As $(Vref-V_{FB})$ is smaller, a rectangular pulse that shortens the ON-period Ton, for which switching devices Q1 and Q2 are ON (conductive), is generated to reduce the energy stored in inductors L1 and L2 and further to keep output voltage Eo at a certain value. Although the feedback signal generator circuit (voltage divider circuit) formed of resistors R1 and R2 and shown in FIG. 13 is omitted from FIG. 4, a feedback signal generator circuit (voltage divider circuit) may be disposed, if necessary.

Now the operations of the buck DC-DC converter according to the invention shown in FIG. 3 will be described in detail below in connection with the operation thereof in each operation phase and with reference to FIGS. 5(a) through 7(b). In FIGS. 5(a) through 7(b), the portions of the circuit not pertinent to a specific phase of operation are not shown.

Figure 5A:
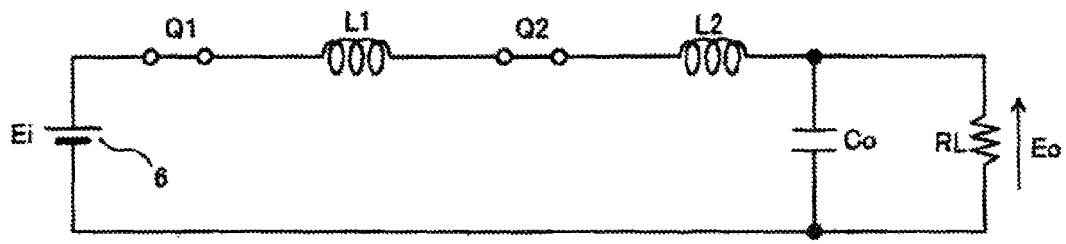
FIG. 5($a$) is a circuit diagram describing the operation state of the DC-DC converter circuit shown in FIG. 3 in a first phase of operation thereof.

FIG. 5(a) describes the state in the ON-period Ton. Switching devices Q1 and Q2 are conductive and inductors L1 and L2 are connected in series such that the energy corresponding the difference between input voltage Ei and output voltage Eo is stored in inductors L1 and L2.

Figure 5B:
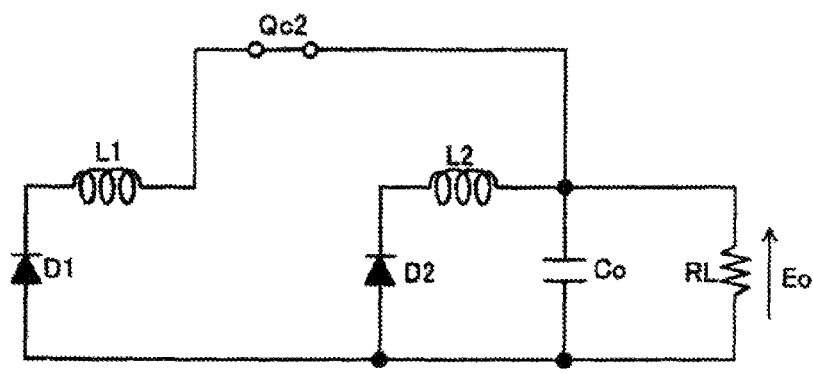

FIG. 5(b) describes the state in the OFF-period Toff. Switching devices Q1 and Q2 are interrupted and changeover switch Qc2 is conductive such that inductors L1 and L2 are connected in parallel to load RL. Two inductors L1 and L2 release the energy stored therein to output capacitor Co and load RL.

Figure 5C:
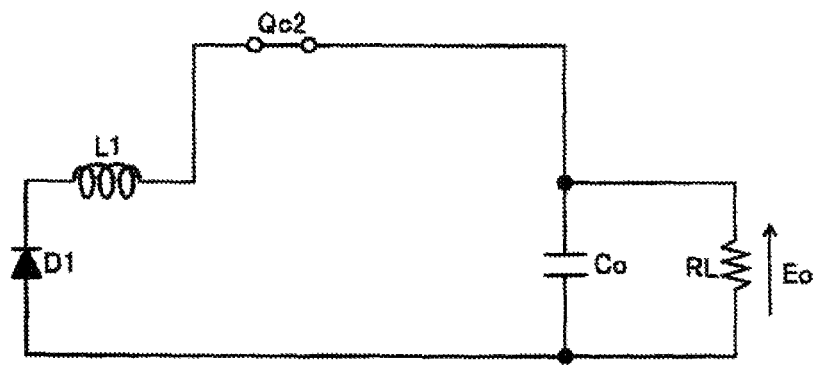

FIG. 5(c) describes the state, in which the energy stored in inductor L2 is smaller than the energy stored in inductor L1, inductor L2 finishes releasing the energy stored therein earlier than inductor L1 in the OFF-period Toff, and only inductor L1 is feeding the energy. In this case, the current flowing through inductor L2 is discontinuous.

Figure 5D:
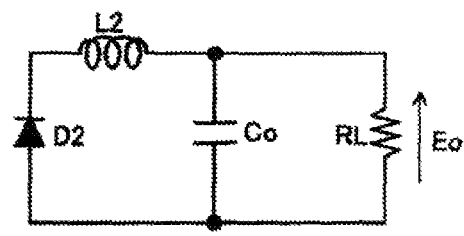

The state described in FIG. 5(d) is opposite to the state described in FIG. 5(c). FIG. 5(d) describes the state, in which the energy stored in inductor L1 is smaller than the energy stored in inductor L2, inductor L1 finishes releasing the energy stored therein earlier than inductor L2 in the OFF-period Toff, and only inductor L2 is feeding the energy. In this case, the current flowing through inductor L1 is discontinuous.

Figure 6A:
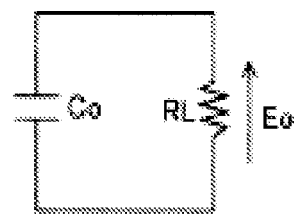
FIG. 6($a$) is a circuit diagram describing the operation state of the DC-DC converter circuit shown in FIG. 3 in a fifth phase of operation thereof.

FIG. 6(a) describes the state, in which inductors L1 and L2 finish releasing the energies stored therein. In this case, the currents flowing through inductors L1 and L2 are discontinuous.

Figure 6B:
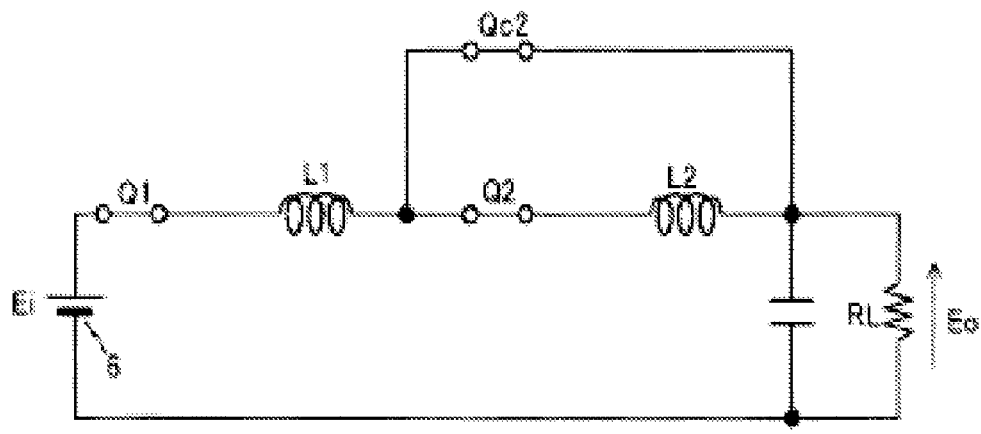
Figure 6C:
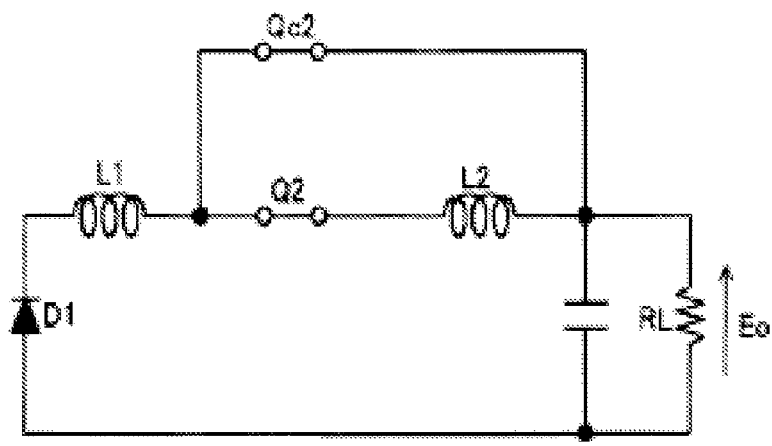

FIGS. 6(b) and 6(c) describe the states set for conducting the transition, in which the ON-period and the OFF-period are changed over to each other, with no problem. If a state, in which switching device Q2 and changeover switch Qc2 are OFF, is caused during the transition from the state, in which switching device Q2 is ON and changeover switch Qc2 is OFF, to the state, in which switching device Q2 is OFF and changeover switch Qc2 is ON, or during the transition from the state, in which switching device Q2 is OFF and changeover switch Qc2 is ON, to the state, in which switching device Q2 is ON and changeover switch Qc2 is OFF, the current flowing through inductor L1 will flow into the floating capacitance connected to the end of inductor L1 on the side of inductor L2. Since the capacitance value of the floating capacitance is very small, the voltage thereof rises rapidly in a short time. The rapidly rising voltage is applied to switching devices Q1 and Q2 and changeover switch Qc2, causing damages in switching devices Q1 and Q2 and changeover switch Qc2.

For preventing the state, in which both switching device Q2 and changeover switch Qc2 are OFF, from causing, it is preferable to conduct the transition from the state, in which switching devices Q1 and Q2 are ON and changeover switch Qc2 is OFF, to the state, in which switching devices Q1 and Q2 are OFF and changeover switch Qc2 is ON, via the state described in FIG. 6(b). It is also preferable to conduct the transition from the state, in which switching devices Q1 and Q2 are OFF and changeover switch Qc2 is ON, to the state, in which switching devices Q1 and Q2 are ON and changeover switch Qc2 is OFF, via the state described in FIG. 6(c).

Figure 7A:
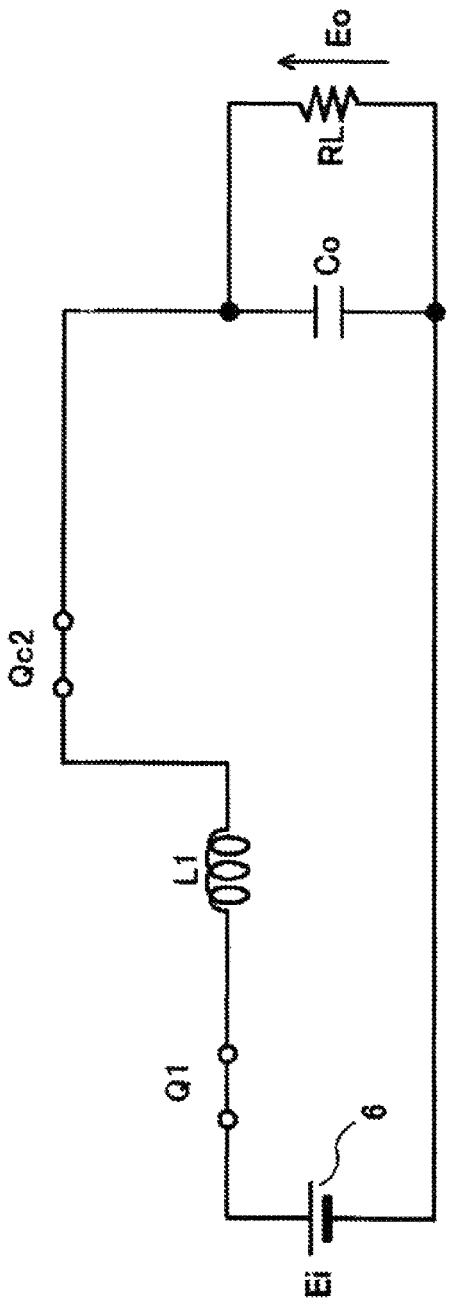
FIG. 7($a$) is a circuit diagram describing the operation state of the DC-DC converter circuit shown in FIG. 3 in an eighth phase of operation thereof.
Figure 7B:
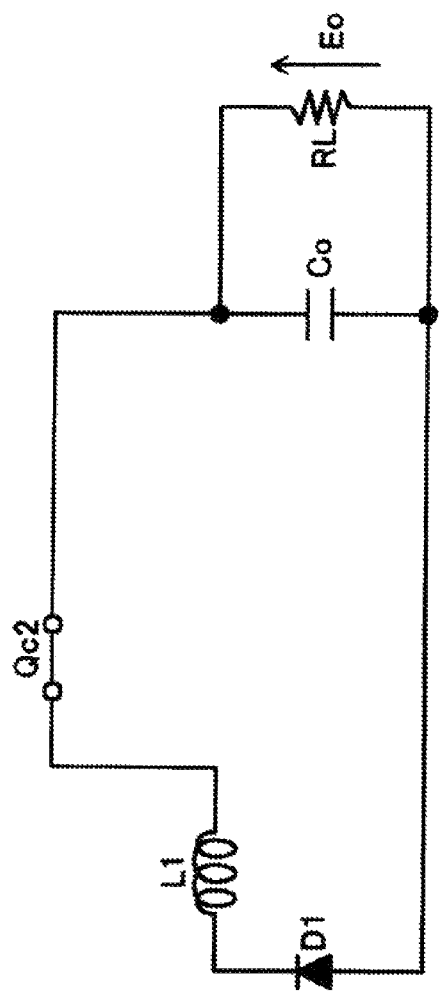

FIGS. 7(a) and 7(b) describe the states, in which switching device Q2 is OFF always, changeover switch Qc2 is ON always, and the DC-DC converter shown in FIG. 3 is made to work for the conventional DC-DC converter by using only inductor L1 but by using neither inductor L2 nor diode D2. As described above, the DC-DC converter according to the invention facilitates lowering the voltage conversion rate (Eo/Ei) at an arbitrary ON-time ratio D. Moreover, the DC-DC converter according to the invention facilitates changing over the performance thereof.

Figure 8:
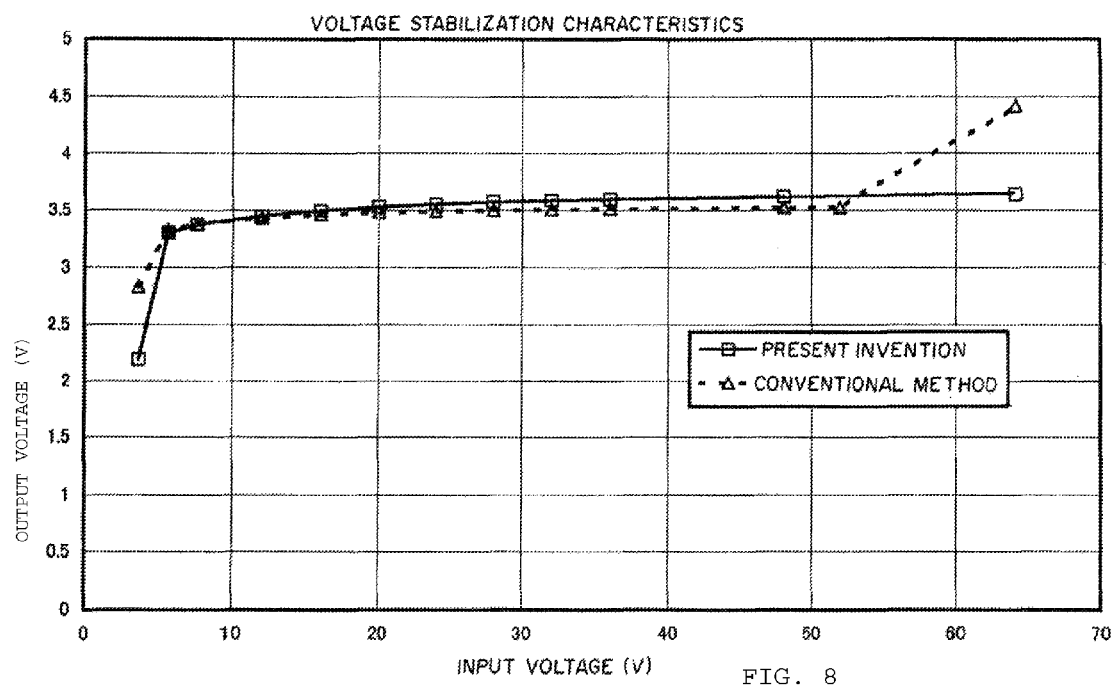
FIG. 8 is a graph describing the results of a circuit simulation on the voltage stabilization characteristics of the buck DC-DC converter shown in FIG. 3.
Figure 9:
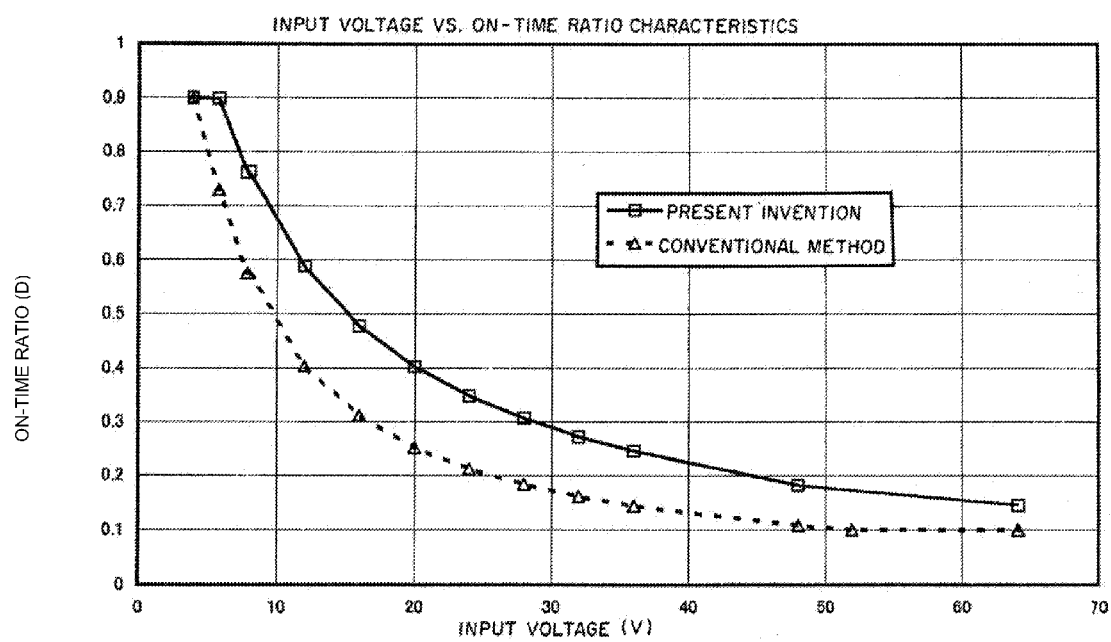
FIG. 9 is a graph describing the results of a circuit simulation on the input voltage vs. ON-time ratio characteristics of the buck DC-DC converter shown in FIG. 3.

FIG. 8 is a graph describing the results of a circuit simulation on the voltage stabilization characteristics of the buck DC-DC converter shown in FIG. 3. FIG. 9 is a graph describing the results of a circuit simulation on the input voltage vs. ON-time ratio characteristics of the buck DC-DC converter shown in FIG. 3. In FIG. 8, the horizontal axis represents the input voltage Ei and the vertical axis the output voltage Eo. In FIG. 9, the horizontal axis represents the input voltage Ei and the vertical axis the ON-time ratio D.

The simulation conditions include the switching period Ts that is 1 µs, the inductance of inductor L1 that is equal to the inductance of inductor L2 and 10 µH, and the capacitance of output capacitor Co that is 440 µF. The ON-time ratio D is set to be variable between 0.1 and 0.9. It is assumed that the ON-time ratio D is fixed at 0.1 in the range, in which D may be smaller than 0.1. It is assumed also that the ON-time ratio D is fixed at 0.9 in the range, in which D may be larger than 0.9.

As the input voltage is higher, the DC-DC converter attempts to stabilize the output voltage therefrom by lowering the ON-time ratio D. However, as the input voltage becomes higher than a certain value, the conventional DC-DC converter can not stabilize the output voltage therefrom as indicated by the broken line in FIG. 8, since the lower limit of the ON-time ratio D is fixed at 0.1. In contrast, the DC-DC converter according to the invention facilitates stabilizing the output voltage therefrom at a higher input voltage as indicated by the solid line in FIG. 8. As described typically in FIG. 9, the DC-DC converter according to the invention facilitates obtaining, as compared with the conventional DC-DC converter, a lower output voltage at the same input voltage and obtaining the same output voltage stably from a higher input voltage.

Figure 10:
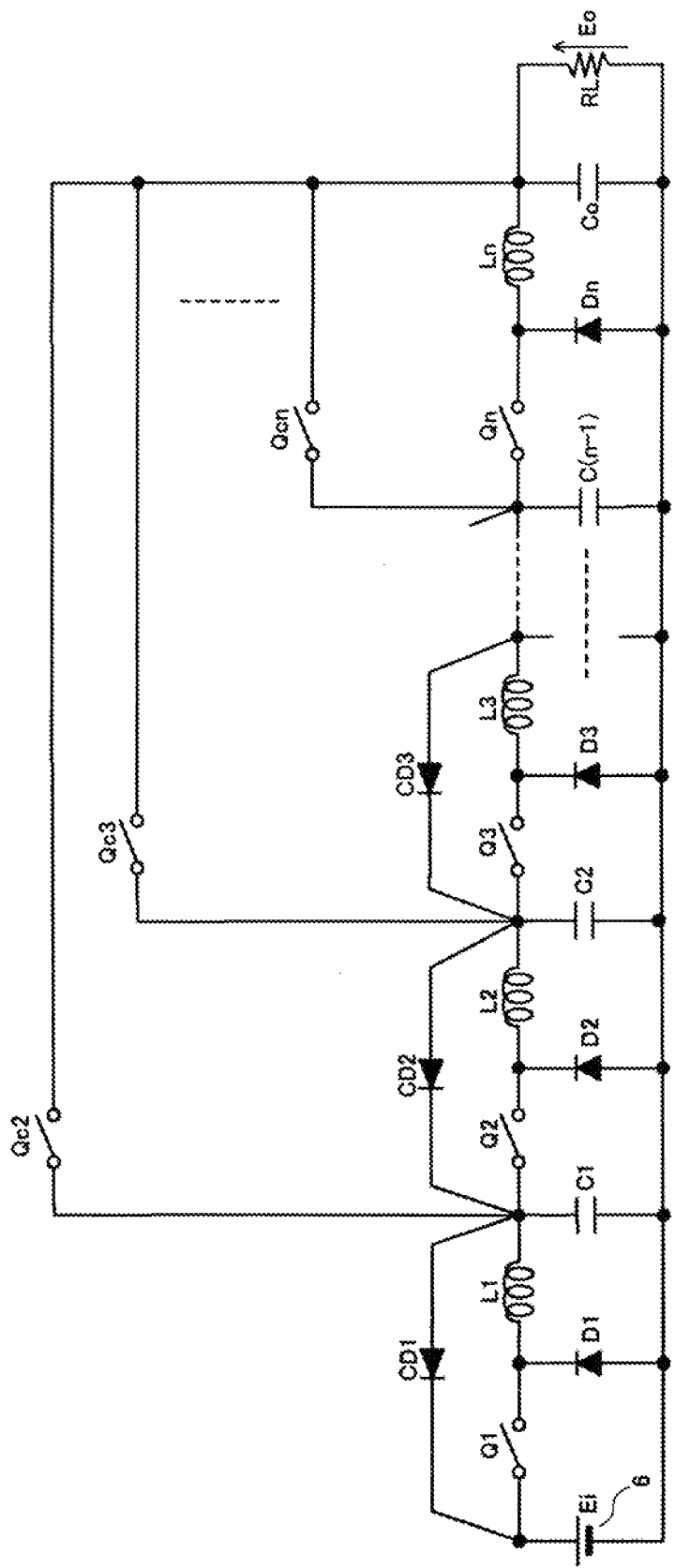
FIG. 10 is a circuit diagram showing a first modification of the fundamental circuit configuration shown in FIG. 1.
Figure 11:
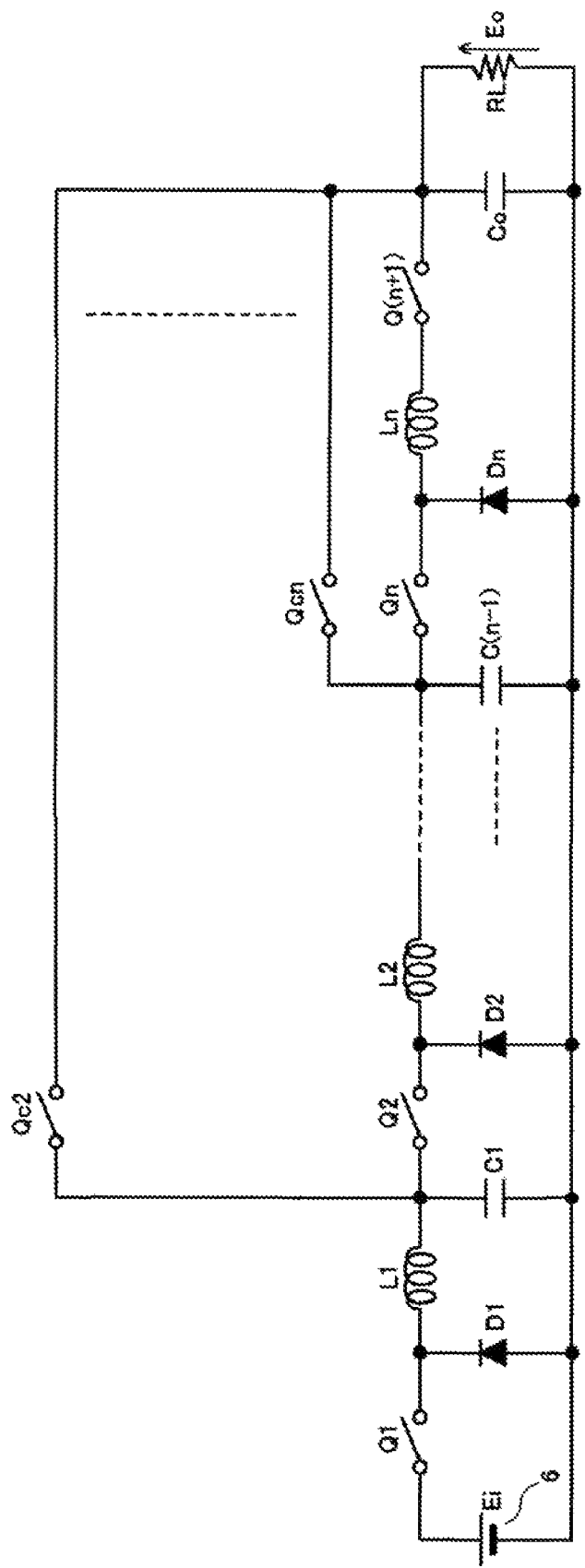
FIG. 11 is a circuit diagram showing a second modification of the fundamental circuit configuration shown in FIG. 1.
Figure 12:
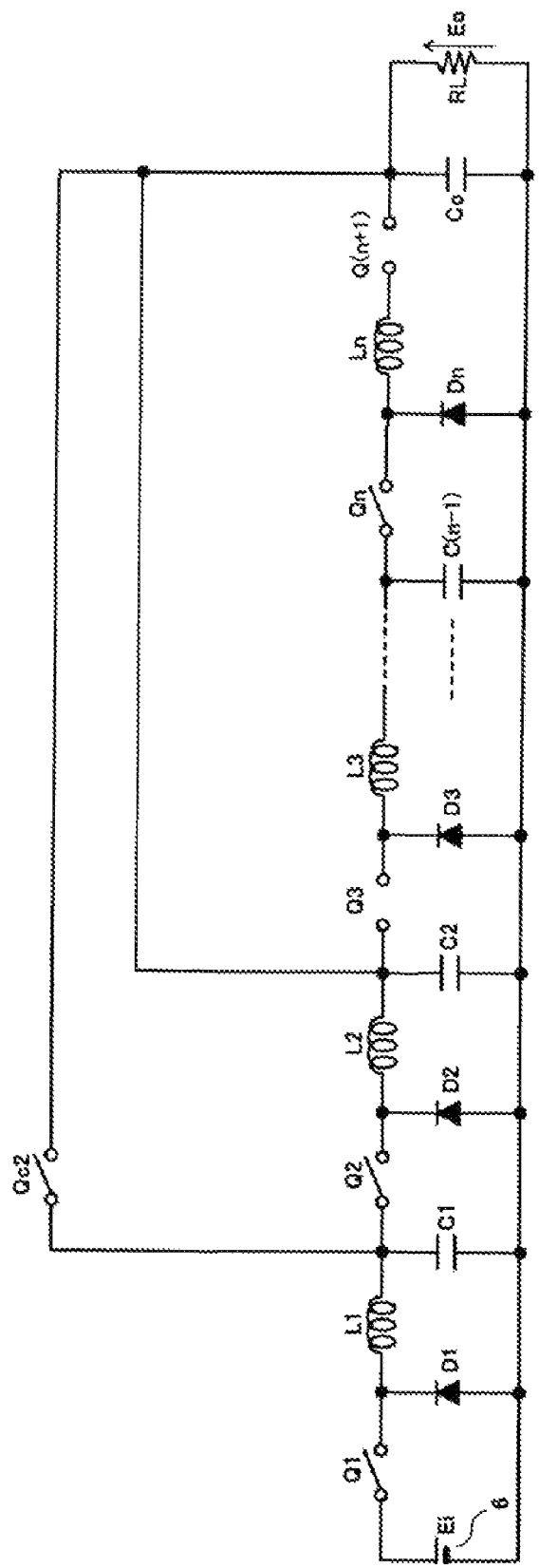
FIG. 12 is a circuit diagram showing a third modification of the fundamental circuit configuration shown in FIG. 1.

FIGS. 10 through 12 show the modifications of the fundamental circuit configuration shown in FIG. 1.

In deriving the formula (5), it is assumed that the inductance values of n-pieces of inductors L1 through Ln are the same L. Now the circuit configuration, in which the inductance values of n-pieces of inductors L1 through Ln are different from each other, will be described below with reference to FIG. 10.

Referring now to FIG. 10, clamping diodes CD1 through CD(n-1) are connected in parallel to (n-1)-pieces of series circuits, each including switching device Qi and inductor Li, respectively. Here, i=1, 2, . . . , and (n-1). Buffer capacitors C1 through C(n-1) are connected between the low-potential-side terminal of DC input power supply 6 and the connection points of inductor Li and switching device Q(i+1).

The terminals of buffer capacitors C1 through C(n-1) connected to the low-potential-side terminal of DC input power supply 6 may be connected alternatively to the high-potential-side terminal (the connection point of output capacitor Co and inductor Ln) of output capacitor Co. For realizing the connections, it is preferable for the capacitance value of the buffer capacitor to be low enough so that the buffer capacitor may be integrated in a semiconductor integrated circuit. In disposing a buffer capacitor in a semiconductor integrated circuit, an ordinary capacitance element or the parasitic capacitance of a MOSFET may be employed for the buffer capacitor.

Now the case, in which inductors L1 through Ln are connected in series in the ON-period Ton, connected in parallel in the subsequent OFF-period Toff, and connected in series again in the subsequent ON-period Ton, is considered. The inductance values of inductors L1 through Ln are represented by L1 through Ln. If the inductance values Li and L(i+1) are not equal to each other, the current flowing through inductor Li and the current flowing through inductor L(i+1) will not be equal to each other at the end of the OFF-period Toff, even if the currents flowing through inductors Li and L(i+1) are the same in the initial ON-period Ton. Then, the currents flowing through inductors Li and L(i+1) are discontinuous to each other in the subsequent ON-period Ton, causing troubles depending on the situation.

If the inductance value Li is smaller than the inductance value L(i+1), that is Li<L(i+1), the current flowing through inductor Li will be smaller than the current flowing through inductor L(i+1) at the start of the subsequent ON-period Ton. In this case, the discontinuous current component (the current flowing through inductor Li—the current flowing through inductor L(i+1)) is fed from diode D(i+1) in the subsequent ON-period. Therefore, any problem is not caused. If the inductance value Li is larger than the inductance value L(i+1), that is Li >L(i+1), the current flowing through inductor Li will be larger than the current flowing through inductor L(i+1) at the start of the subsequent ON-period Ton. In this case, the discontinuous current component (the current flowing through inductor Li—the current flowing through inductor L(i+1)) has nowhere to flow to. The discontinuous current component flows into the floating capacitance connected to the end of inductor Li on the side of inductor L(i+1). The voltage at the end of inductor Li on the side of inductor L(i+1) rises rapidly, causing damages in the circuit elements connected to the end of inductor Li on the side of inductor L(i+1).

For the countermeasures against the trouble described above, buffer capacitors Ci and clamping diodes CDi are added. If the variations between the inductance values L1 through Ln are as small as those caused through the manufacture of inductors L1 through Ln, it will be enough to add buffer capacitors C1 through C(n−1) only. If the variations between the inductance values L1 through Ln are large to some extents such as in the case, in which the inductance value Li is set to be larger than the inductance value L(i+1) intentionally, it will be impossible to absorb the discontinuous current component only by buffer capacitors C1 through C(n−1). In this case, clamping diode CDi is disposed for the countermeasures.

As the voltage at the end of inductor Li on the side of inductor L(i+1), that is the anode potential of clamping diode CDi, rises rapidly and exceeds the cathode potential of clamping diode CDi connected to switching device Qi plus the forward voltage of clamping diode CDi to the higher side, clamping diode CDi becomes conductive. Clamping diode CDi conductive makes the discontinuous current component (that is the current flowing through inductor Li—the current flowing through inductor L(i+1)) flow through clamping diode CDi. Since changeover switches Qc2 through Qcn are ON while switching device Qi is OFF, a difference voltage ((the output voltage Eo—the input voltage Ei)<0) is applied to clamping diode CD1 in the forward direction. The same output voltage Eo is applied to the cathodes and anodes of clamping diodes CD2 through CD(n−1). Therefore, clamping diodes CD1 through CD(n−1) do not become conductive.

Clamping diode CDi functions as a clamping element. Any circuit element that functions as a clamping element may be employed in substitution for clamping diode CDi. By making the clamping element work, the voltage at the end of an inductor is prevented from rising and the circuit elements in the vicinity of the end of the inductor are prevented from being damaged.

Depending on the relations between the inductance values L1 through Ln, it is possible to eliminate some of or all clamping diodes CD1 through CD(n−1) and some of or all buffer capacitors C1 through C(n−1). If it is guaranteed that the inductance values L1 through Ln are the same perfectly, clamping diodes CD1 through CD(n−1) and buffer capacitors C1 through C(n−1) will be unnecessary. If the differences between the inductance values L1 through Ln are small, clamping diodes CD1 through CD(n−1) will be unnecessary. If the differences between the inductance values L1 through Ln are small and if clamping diodes CD1 through CD(n−1) have been disposed already, buffer capacitors C1 through C(n−1) may be omitted.

The inductance relation Li<L(i+1) poses no problem from the view points of damage prevention and safety, since the discontinuous current component is fed from diode D(i+1) in the subsequent ON-period Ton. However, the inductance relation Li<L(i+1) is not preferable from the view point of power conversion efficiency, since a current flows through diode D(i+1) in the ON-period. When the inductance relation is Li >L(i+1) and clamping diode CDi is conductive, no problem is posed from the view points of damage prevention and safety. However, since the current flowing through clamping diode CDi causes a reactive current, the inductance relation Li>L(i+1) is troublesome from the view point of power conversion efficiency. Therefore, it is preferable for the inductance values to be $L1 \leq L2 \leq \ldots \leq Ln$. It is more preferable for the inductance values to be $L1=L2=\ldots=Ln$.

Now the countermeasures against the problem caused by the very low input voltage Ei will be described below.

The DC-DC converter according to the invention provides an ON-time ratio D lower than the ON-time ratio that the conventional DC-DC converter provides. Therefore, the ON-time ratio D reaches the maximum value (=0.9) as described in FIGS. 8 and 9 in the range, in which the input voltage Ei is very low, making it impossible to guarantee the required output voltage. Switching device Q(n+1) shown in FIG. 11 is added for obviating the problem described above. Switching device Qm (m is any of positive integers 2 through n) and switching device Q(n+1) shown are made to be OFF always to make inductors Lm through Ln irrelevant to the DC-DC converter. In the state described above, switching devices Q1 through Q(m−1) and changeover switches Qc2 through Qc(m−1) are made to be ON and OFF. (When m=2, only switching device Q1 is made to be ON and OFF.) By making switching devices Q1 through Q(m−1) and changeover switches Qc2 through Qc(m−1) ON and OFF as described above, the DC-DC converter according to the invention that employs n-pieces of inductors Li through Ln is modified to a DC-DC that employs (m−1)-pieces of inductors Li through L(m−1).

In the case described above, the parameter n in the formula (5) describing the conversion performance of the DC-DC converter is replaced by (m−1). By employing a smaller number of inductors, the parameter n in the formula (5) is replaced by a value smaller than n. Therefore, it will be possible to guarantee a low output voltage value Eo, even if the input voltage value Ei becomes low.

When m=2, the conventional DC-DC converter shown in FIGS. 7(a) and 7(b) is obtained. Even if switching device Q(n+1) is not disposed, the functions of a DC-DC converter will be obtained. However, if switching device Q(n+1) is not disposed, inductor Ln that is irrelevant to the operation of the DC-DC converter at the time, at which the performance thereof is changed over, is connected always to output capacitor Co. Inductor Ln connected always to output capacitor Co works as a kind of load and lowers the power conversion efficiency sometimes. Therefore, it is better to dispose switching device Q(n+1).

Clamping diodes CD1 through CD(n−1) may be disposed in the DC-DC converter shown in FIG. 11 in the same manner as in the DC-DC converter shown in FIG. 10. Depending on the conditions, it is possible to eliminate some of or all clamping diodes CD1 through CD(n−1) and some of or all buffer capacitors C1 through C(n−1) from the DC-DC converter shown in FIG. 10.

In the above descriptions, switching devices Q1 through Qn and changeover switches Qc2 through Qcn are described in connection with a P-channel MOSFET. Alternatively, switching devices Q1 through Qn and changeover switches Qc2 through Qcn may be realized by an N-channel MOSFET or by an insulated gate bipolar transistor (hereinafter referred to as an "IGBT"). Switching device Q(n+1) may be a P-channel MOSFET, an N-channel MOSFET or an IGBT. When an N-channel MOSFET or an N-channel IGBT is employed, a level-shift circuit is disposed sometimes in driver circuit 40. Commutation diodes D1 through Dn may be replaced by a switching device for synchronous rectification formed of a MOSFET, of a combination of a MOSFET and a diode or of a combination of an IGBT and a diode.

The invention has been described with reference to certain preferred embodiments thereof. It will be understood, however, that modifications and variations are possible within the scope of the appended claims.

What is claimed is:

1. A switching power supply comprising:
    a DC power supply comprising a low-potential-side terminal and a high-potential-side terminal;
    an output capacitor comprising a first end and a second end, the first end of the output capacitor being connected to the low-potential-side terminal of the DC power supply;
    a first switching device through an n-th. switching device, said n being a positive integer equal to 2 or larger;
    a first inductor through an n-th. inductor;
    wherein the first switching device through the n-th. switching device and the first inductor through the n-th. inductor are connected alternately between the high-potential-side terminal of the DC power supply and the second end of the output capacitor;
    wherein the first switching device is connected to the high-potential-side terminal of the DC power supply;
    wherein the n-th. Inductor is connected to the second end of the output capacitor;
    a commutation element, n-pieces of the commutation elements being connected between a connection point of an i-th. switching device and an i-th. inductor and the low-potential-side terminal of the DC power supply, said i being positive integers 1 through n; and
    a changeover switch, (n−1)-pieces of the changeover switches being connected between a connection point of a (j−1)-th. inductor and a j-th. switching device and the second end of the output capacitor, said j being positive integers 2 through n.

2. The switching power supply according to claim 1, wherein the first through n-th. switching devices are turned ON and OFF synchronously; and the (n−1)-pieces of the changeover switches are turned ON and OFF in compensation for ON and OFF of the first through n-th. switching devices for controlling an ON-OFF timing of the first through n-th. switching devices and for obtaining a predetermined output voltage.

3. The switching power supply according to claim 1, the switching power supply comprising:
    a first mode of operation, the first mode of operation comprising: turning ON and OFF the first through n-th. switching devices synchronously, and turning ON and OFF the (n−1)-pieces of the changeover switches in compensation for ON and OFF of the first through n-th. switching devices for controlling an ON-OFF timing of the first through n-th. switching devices and for obtaining a predetermined output voltage; and
    a second mode of operation, the second mode of operation comprising: turning OFF an m-th. switching device of the first through n-th, switching devices, said m being any of positive integers 2 through n, turning ON and OFF the first through (m−1)-th. switching devices synchronously, turning ON the m-th. changeover switch of the (n−1)-pieces of the changeover switches, turning OFF the (m+1)-th. through n-th. changeover switches, if m<n, and turning ON and OFF the second through (m−1)-th. changeover switches in compensation for the turning ON and OFF the first through (m−1)-th. switching devices, if m>2, for controlling an ON-OFF timing of the first through (m−1)-th. switching devices and for obtaining a predetermined output voltage.

4. The switching power supply according to claim 3, the switching power supply further comprising:
    an (n+1)-th. switching device connected between the n-th inductor and the second end of the output capacitor;
    wherein the (n+1)-th. switching device being ON in the first mode of operation; and
    wherein the (n+1)-th. switching device being OFF in the second mode of operation.

5. The switching power supply according to claim 1, wherein the commutation element comprises a diode.

6. The switching power supply according to claim 1, wherein the commutation element comprises a synchronous rectifier transistor.

7. The switching power supply according to claim 1, the switching power supply further comprising a buffer capacitor connected between at least one of the connection points of the (j−1)-th. inductor and the j-th. switching device and the low-potential-side terminal of the DC power supply or the second end of the output capacitor.

8. The switching power supply according to claim 1, wherein inductance values L1 through Ln of the first through n-th. inductors are related with each other by a following relational expression, $$Lk \leq L(k+1)$$

wherein k is positive integers 1 through (n−1).

9. The switching power supply according to claim 1, the switching power supply further comprising a clamping element connected in parallel to at least one of n-pieces of series circuits comprising the i-th. switching device and the i-th. inductor.

10. The switching power supply according to claim 9, wherein the clamping element comprises a diode comprising a cathode connected to a terminal of the series circuit on a side of the switching device and an anode connected to a terminal of the series circuit on a side of the inductor.

* * * * *